Nov. 24, 1959   J. R. DAVEY ET AL   2,914,612
TELEGRAPH START-STOP SYNCHRONIZER AND CORRECTOR
Filed April 24, 1957   5 Sheets-Sheet 1
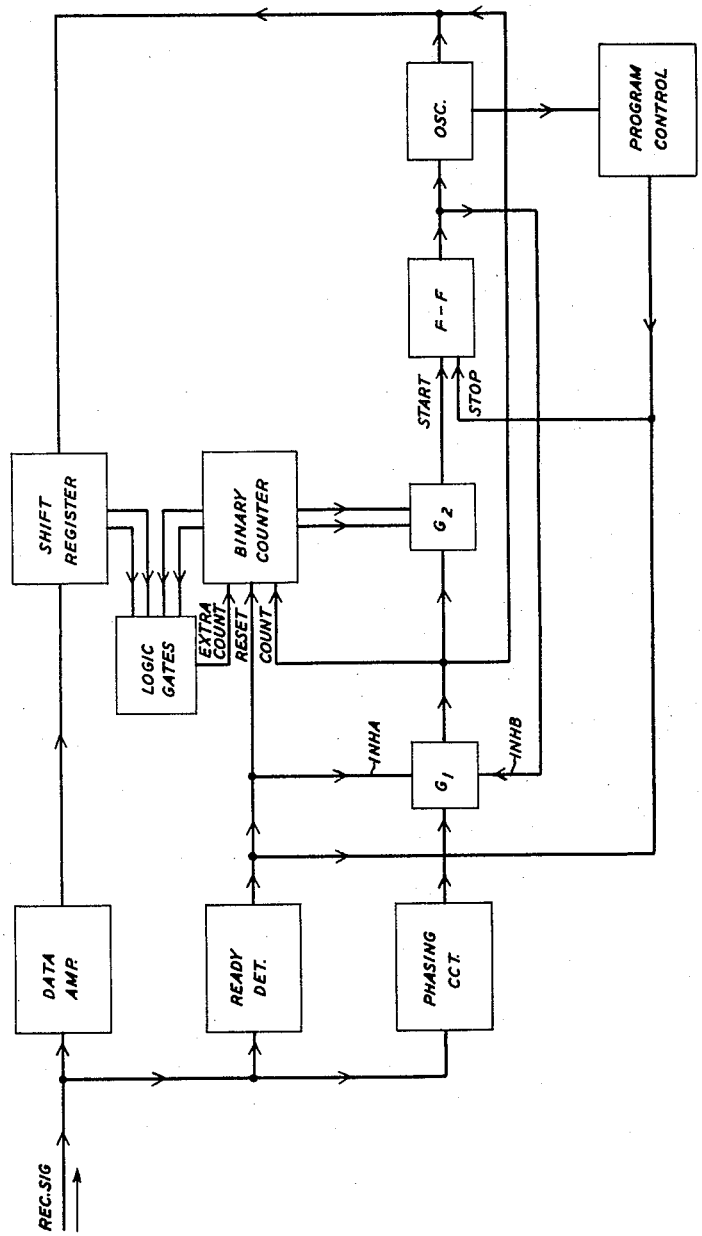
FIG. I
INVENTORS J. R. DAVEY
W. T. REA
BY
John E. Cassidy
ATTORNEY

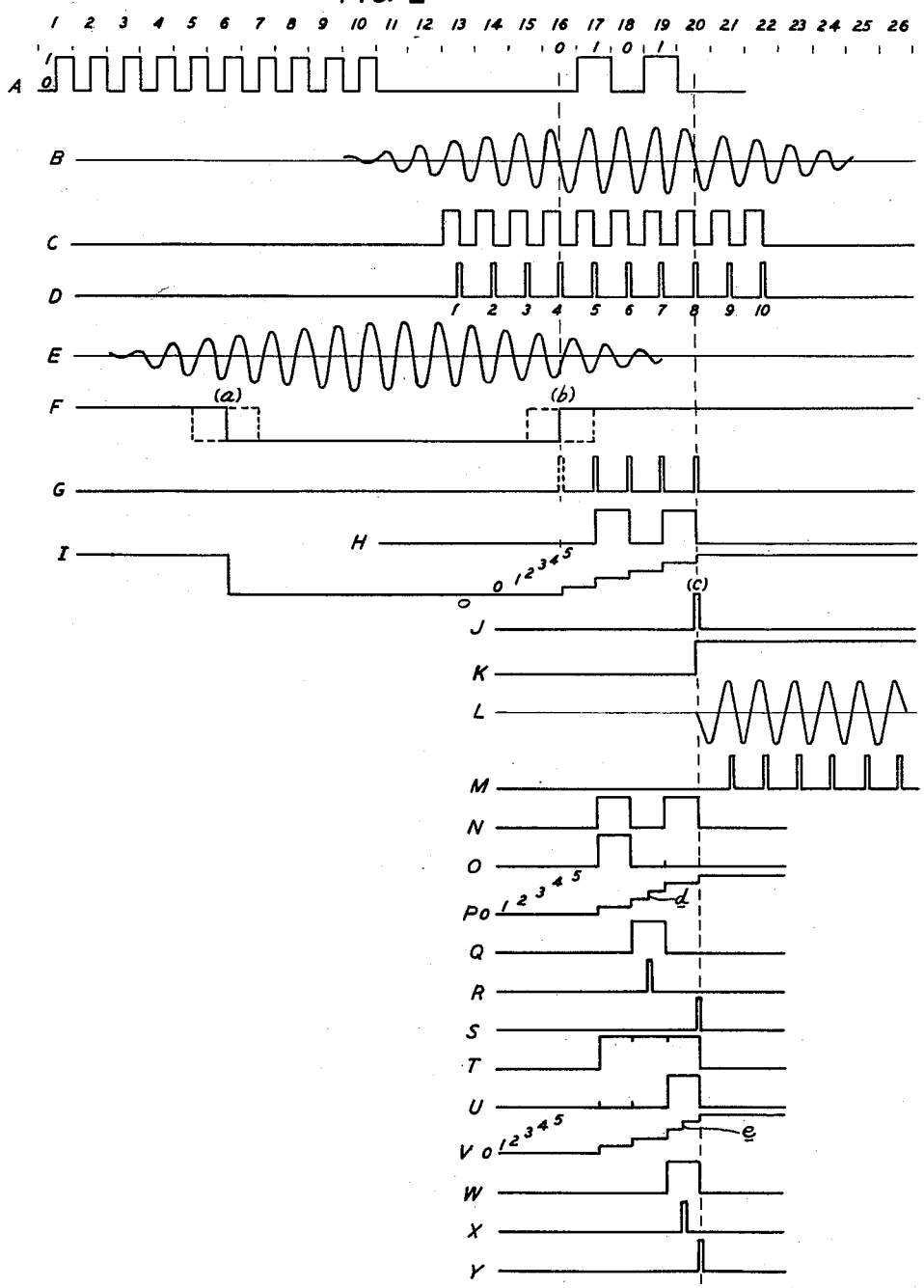

| FIG. 4 | FIG. 6 |
|---|---|
| FIG. 4 | FIG. 5 |

INVENTORS J. R. DAVEY
W. T. REA
BY
John E. Cassidy
ATTORNEY

INVENTORS J. R. DAVEY
W. T. REA
BY
John E. Cassidy
ATTORNEY

United States Patent Office 2,914,612
Patented Nov. 24, 1959

2,914,612

TELEGRAPH START-STOP SYNCHRONIZER AND CORRECTOR

James R. Davey, Franklin Township, Somerset County, and Wilton T. Rea, Bernardsville, N.J., assignors to Bell Telephone Laboratories, Incorporated, New York, N.Y., a corporation of New York Application April 24, 1957, Serial No. 654,964

13 Claims. (Cl. 178—53.1)

This invention relates to the maintenance of isochronism in the operation of telegraph systems which function on a start-stop basis.

An object of the invention is the improvement in isochronism of start-stop telegraph circuits.

By start-stop operation in telegraphy is meant the transmission and reception of signal trains characterized in that each train has at its beginning a distinctive signal arrangement which indicates the start of a new train, marks the location of the first information-bearing element and indicates the proper phasing of the signal element sensing function. In addition, if the signal trains are not of equal length, the train must terminate with a distinctive arrangement indicating to the receiver that it should stop and await the next train. An example of a start-stop signal system arrangement in which the start signal and stop signal per se are in the simplest form and the trains are all of equal length is the multi-element two-condition start-stop permutation code signal arrangement widely used in teletypewriter service in the United States. In this arrangement each train of signals comprises seven elements. The first element of the train is a start signal element and is always a spacing signal element. The start signal element is followed by five signal elements, each of which may be either marking or spacing, which convey the message intelligence, and the last signal element of the train, which follows the intelligence-bearing elements and is always a marking signal element, is the stop signal element. The marking stop condition prevails between successive trains and its duration depends upon the rate at which the trains are transmitted. It normally has a minimum length of 1.4 elements. For the marking stop signal condition, current is normally transmitted and received by the teletypewriters in the system. For the spacing start signal condition, the current transmitted and received by the teletypewriters during the stop signal condition ceases. The receiving device is therefore normally in the marking or current condition when idle and during the stop interval between the reception of successive trains. Upon the reception of the spacing or no-current start signal condition, the receiver is set into operation. It is maintained in operation for an interval equal in duration to the duration of a single signal train under control of a motor or an oscillator, which operates at substantially the same rate as that of a motor or oscillator which controls the signal transmitter. At the end of this interval, the receiver is stopped automatically. During the interval while the receiver is in operation, and at proper times in its cycle, it senses the received signal elements. While the transmitter is transmitting trains in sequence, without interruption, the receiver will be arrested for a short interval during each stop signal element. Then it will be started on a new cycle, in response to the reception of the start signal element of the following train. In order to permit this, the receiver must attain the start position, in which it is arrested during the reception of the stop signal element, long enough before the end of the duration of the stop interval to compensate for any variation in the durations of the trains as received.

It should be apparent from the foregoing that each train of signals as received is independent of prior trains. Variations in the times of reception of trains cannot accumulate. Each train, at the start of its reception, starts a new cycle of operation of the receiver, of a duration quite equal to the duration of a standard train, during which the intelligence-bearing signal elements are sensed at the proper times with small possibility of error which might be caused by sensing for a signal element at an improper time. Since the message intelligence-bearing signal elements are all of equal duration, sensing for each of these elements is performed at uniform intervals during a single cycle of standard duration and each of these elements is sensed at the middle of its interval.

It should be apparent from the foregoing also that the proper operation of the start-stop system is wholly dependent upon the recognition of the start element by the receiver. When the receiver is in the stop condition it will be set into operation for an interval, equal to the duration of one signal train, not only by a proper start signal element, but by an occurrence, such as a short interruption in the flow of current, which simulates a start signal element, unless the receiver is provided with some means of protection against these spurious conditions. It is not unusual, when such an abnormal condition occurs during continuous transmission and reception, for the receiver to continue to run erroneously for a number of trains, because upon completion of an erroneous cycle of operation, the receiver may be restarted by any spacing signal element among the now displaced intelligence-bearing signal elements, should, as a result of the previous erroneous start, one of these spacing signal elements be received after the receiver has been stopped and before a bona fide start signal is received.

When teletypewriter systems operating on the start-stop principle are controlled by means of conductors enclosed in cable, the number of abnormal conditions giving rise to false starts is kept to a minimum. When open-wire lines are employed, the number of false starts is greater. However, when the interconnection is through a radio link, due to atmospheric and other conditions, the number of false starts may be at times quite large. The present invention affords an arrangement wherein the start signal may be identified with great accuracy. While the arrangement of the invention is applicable to systems in which telegraph equipment is interconnected through cable or open-wire lines, it is contemplated that the invention will initially be most widely applied in computer systems and in radio telegraph systems, particularly those in which the ratio of signal level to noise level is low and in such systems in which the need of high accuracy in reception justifies the expense of the additional equipment required.

It will be seen from the foregoing that in start-stop operation the signal transition between the marking stop condition and the spacing start condition performs three functions as follows: (1) It indicates the start of a new signal train; (2) it locates the first information-bearing signal element; and (3) it sets the phase of the information-bearing signal element sensing. As is well understood, these elements are sensed in their center portions and the centers are fixed in relation to the position of the start signal.

Since the loss of the start signal element means the loss of the whole signal train, which may include a number of separable code combinations or "words" which may, for instance, define the magnitude of a number of quantities, it is important that the start signal be provided with distinguishable characteristics commensurate with its importance. The present invention provides a redundant start signal, as it will be termed hereinafter, and affords better means of identifying the beginning of the message than has heretofore been available.

In the present arrangement, each signal train has at its head end a group of preliminary signal elements, preceding the message or information-bearing signal elements. In these preliminary signals, a distinctive pattern of signal elements of double the standard frequency is first transmitted followed by a number of no-signal elements and then by the redundant start signal elements. The double frequency signal elements perform what is termed the ready function. They afford a distinctive signal pattern, which cannot occur in any message, to "ready" the receiver, that is, to inform the receiver that action is required.

The latter portion of the double-speed signal train performs what is termed the phasing function. The double frequency signals are averaged by a tuned circuit which is effective in minimizing the effect of noise. The tuned circuit passes a delayed narrow band and thereafter impresses the signals on a pulsing circuit which produces a sequence of sharp narrow pulses which, because of the delay introduced by the filter, straddle the single start signal element. The redundant start signal elements are separated from the double-speed signals by an interval equal in duration to the duration of an integral number of signal elements. Furthermore, the redundant start signal elements, being of normal duration, are of twice the duration of the double-speed signals. Since the frequency of the sharp narrow pulses from the phasing circuit is twice that of the redundant start signal elements and since they straddle the start signal elements, they may be employed to sense the redundant start signal elements at their middle portion, in a counting and correcting operation to be described hereinafter and to start the local oscillator or clock. The oscillator times the remainder of the train and, in cooperation with a binary counter and a number of diode gates, which are opened at proper counts, separate the signal elements in the following message portion of the train into proper groupings to form the same "word" combinations as are transmitted.

For reasons to be explained hereinafter, the redundant pattern has four signal elements. These elements may be for instance, 0101, where "1" represents a current and "0" a no-current condition. It is to be understood that the number of signal elements employed in the redundant start signal pattern will depend upon requirements.

As will be made clear hereinafter, the ready signal is obtained by filtering and full wave rectification of the double frequency signals at the head of the preliminary signal train. The double frequency signals may be modulated by noise in the transmission link and the shape of the rounded signal envelope after filtering is variable, so that the rectified signal is uncertain as to its beginning and end.

The rectified ready signal is employed to disable a diode gate through which the incoming redundant signals must first pass. The circuit is so arranged that counting of the redundant start signals, which are incoming through a separate circuit branch to the gate, cannot start until the disabling condition is terminated. The variable rounded envelope introduces an uncertainty as to which of the redundant elements is first permitted to pass through the gate and be counted. The counting may start on time or late depending upon the shape of the envelope. This uncertainty is quantized. In the simplest case it requires the allocation of an interval equal to the duration of one of the redundant signal elements to compensate for it. In other cases it may require two or three or more.

In addition to the uncertainty mentioned in the foregoing, it should be obvious that the redundant signal pattern, as counted, after being permitted to pass through the gate, whether in its entirety or abridged, may contain one or more errors due to the vagaries of transmission. An error in the two-condition signal elements results in the changing of a no-current, or "0," signal condition to a current or "1" signal condition or vice versa. The redundant start signal pattern may be arranged to include as many elements as are required to compensate for as much uncertainty in the location of the first element of the redundant pattern and as many errors in their reception as may be necessary and justifiable economically.

Assume that the uncertainty is represented by $U$ elements and that the number of possibly erroneous signal elements in the redundant pattern against which protection is desired is represented by $k$. Assume also that the receiver must sample $D$ elements of the redundant start pattern to get the information it needs. The redundant pattern, therefore, must contain $D+U$ elements. Then, for the general case, $N$, the number of choices of redundant start signal permutations required to be considered is:

$$[U+1]\sum_{r=0}^{r=k} C_{D,r}\text{, where } C_{D,r} = \frac{D!}{r!(D-r)!}$$

which must be equal to or smaller than the number available $2^D$.

The present invention affords circuitry to care for the case in which the uncertainty $U=1$ and the number of errors $k=1$. Except for the case in which $k=0$, that is the case in which no provision is made for caring for any errors, this is the simplest case.

When $D=3$, $N=8$ and $2^D=8$

The redundant start signal may be 0101 or its inverse 1010. In the present invention it is assumed that it is 0101.

If the receiver samples the first three elements on time it records:

010 if there is no error
011
000 }—if there is one error
110

If the receiver samples one element too late, it records:

101 for no error
100
111 }—if there is one error
001

Since none of the foregoing eight groups of three elements each appears in both groups which are on time and groups which are late, the receiver can be arranged to determine whether a group is on time or late by counting and sampling the condition of three elements of the group as received.

The manner in which the circuit of the present invention determines whether a received redundant start signal group is on time, and therefore needs no adjustment in the counting to fix the position of the first message element, or is late, in which case the counting must be adjusted is as follows:

A counter is driven by pulses produced in the phasing circuit in response to the double frequency signals. These pulses, as explained, are subjected to a delay and then straddle the redundant group. They occur at the middle of each element of the redundant group. The first pulse applied to the counter is considered to represent a count of 1. The pulses are stored in a storage register and are simultaneously counted by a binary counter. After two elements have been stored and with the count at 2, the receiver does one of three things:

(1) If the first two elements sampled are 10, indicating a late sampling, the receiver is arranged, in a manner to be explained hereinafter, to produce an extra pulse and impress it on the counter, then changing the count to 3. The third redundant pulse will change the count to 4.

(2) If the first two samples are 00 or 11, the receiver withholds the extra impulse until the third pulse of the redundant group has been examined. It then impresses an extra impulse on the binary counter if the third sample is 1. This advances the counter to the 4 count. If the third sample is 0, no extra impulse is impressed on the binary counter.

(3) If the first two samples of the redundant group are 01, the receiver does not impress an extra impulse on the binary counter.

As a result of the foregoing, the binary counter attains the count of 4 during the reception of the fourth or last element of the redundant group, regardless of whether or not the receiver began sampling on time or late, and in spite of any single error in the redundant start signal group. Thus the count of 5, following the count of 4, designates the first signal element of the message.

These and other features of the invention may be understood from the following description when read with reference to the associated drawings which taken together disclose a preferred embodiment in which the invention is presently incorporated. It is to be understood that the invention may be incorporated in other embodiments which will be readily suggested to those skilled in the art from a consideration of the following description. In the drawings:

Fig. 1 is a diagram showing largely by means of captioned rectangles the relationship of the major components of the present system;

Fig. 2 shows a number of wave patterns used in explaining the invention;

Figures 3, 4:
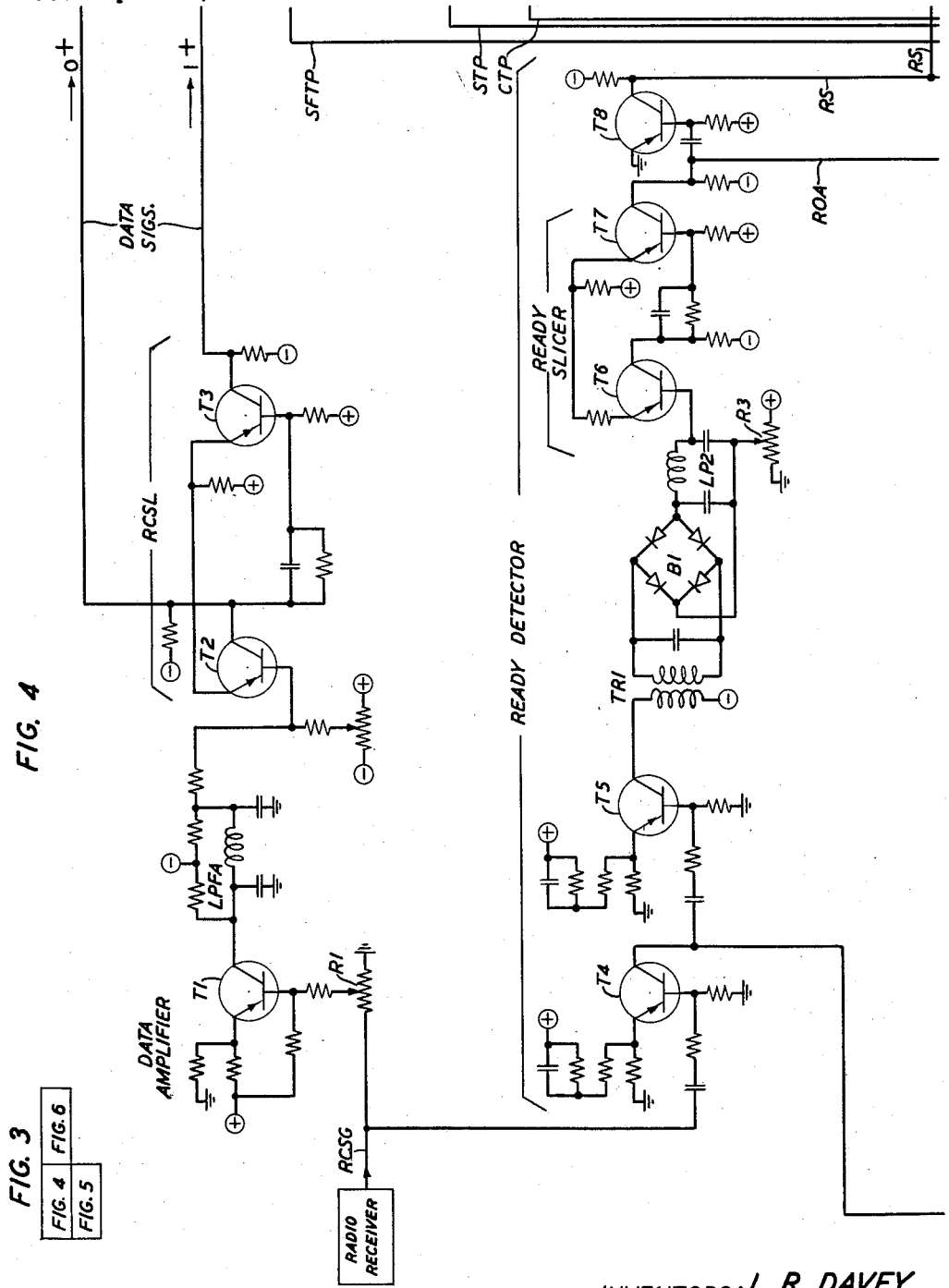
Fig. 3 shows the manner in which Figs. 4, 5 and 6 should be disposed, each in relation to the others, to form an operative circuit of the present invention.
Figs. 4, 5 and 6 disposed as in Fig. 3 show the circuit of the invention.

First, the present system will be described functionally before proceeding with the detailed description. Refer now to Figs. 1 and 2. As shown in wave form A in Fig. 2, the synchronizing pattern occupies 19 time slots of standard duration. At the left in wave form A, time slots 1 to 10 are occupied by signal-no-signal reversals at twice the speed of normal signaling. The rate of normal signaling is as shown in time slots 16 to 19, for instance. Reference to the extreme left-hand portion of the double frequency signals of wave form A shows the beginning of the first time slot. It is occupied by a no-current signal element of half-normal duration. The latter half of the first time slot is occupied by a current signal element of half-normal duration. Each of the first ten time slots is similarly occupied. That is to say, the first half of the interval of each of the time slots is occupied by a no-current signal element. The latter half of the time slot is occupied by a current element. Thus the first ten time slots are occupied by ten "0"–"1" signal conditions. The frequency of these reversals is twice the normal signaling frequency. Following the first ten double-speed reversals a "0" signaling condition persists throughout signal intervals 11 to 16, inclusive, that is, during six normal signal intervals. The first five of these, that is, intervals 11 to 15 inclusive, separate the last of the double-speed reversals from the beginning of the redundant start signal pattern. The redundant start signal pattern starts with a "0" condition during signal interval 16 and persists during four signal intervals, signal intervals 16 to 19 inclusive. During this interval the redundant start signal pattern 0—1—0—1 is transmitted. It is assumed in the present embodiment that the first information-bearing signal element will occupy the twentieth time slot, thus starting immediately after the reception of the last of the four redundant start signal elements, which occupies time slot 19. As stated in the foregoing and now emphasized, the circuit of the present invention is arranged to definitely identify the position of signal element 20 notwithstanding a possible delay in sampling the first of the redundant start signal elements and notwithstanding also a single error introduced by the vagaries of transmission into the standard redundant signal pattern.

The alternating "0" and "1" conditions during the first ten time slots serve two purposes. First, they indicate the phase relationship of the received message elements. Second, they serve to alert the receiver to the fact that a new message is about to begin.

Refer now to Fig. 1. The incoming signal trains, each of which starts with a synchronizing pattern such as shown in wave form A in Fig. 2, are applied through the upper left-hand conductor shown in Fig. 1 designated Rec.—Sig. to the signal receiver. From the incoming conductor the signals are directed to three parallel branches: These are:

(1) The data amplifier branch, which establishes definite direct-current levels for the "0" and "1" conditions of the signals before presentation to the shift register. This branch also contains a low pass filter, not shown in Fig. 1, to reduce noise.

(2) The ready detector branch, which responds to the fundamental frequency of the double-speed signals occurring during the first ten time slots. The tuned circuit of the ready detector, not shown in Fig. 1, has a response as shown in wave form E in Fig. 2. After rectification and wave-shaping the signal wave shown in wave form F in Fig. 2 is produced. Due to noise and amplitude fluctuations, the transitions of this signal may have an uncertainty approaching one time slot a shown at $a$ and $b$ in wave form F.

(3) The phasing circuit, which has a narrow band pass filter with sufficient envelope delay to give the response indicated in wave form B in Fig. 2. It will be observed that the response is maximum during the reception of the "0—1—0—1" redundant start group.

After squaring in the phasing circuit branch, wave B appears as shown in wave form C in Fig. 2 with the negative-going transitions of the wave located at the centers of the time slots of normal duration. The transitions in turn are applied to a pulsing circuit which produces the narrow pulses shown in wave form D in Fig. 2. Reference to wave form D indicates that the narrow signal pulse designated 4, for instance, occurs about at the center of time slot 16. Pulses 5, 6 and 7 occur about at the centers of time slots 17, 18 and 19 respectively.

The pulses from the phasing circuit are applied to gate G1 in Fig. 1. The output of the ready detector is applied also to gate G1 through conductor INHA and, during the interval that wave form F persists, it inhibits gate G1. That is to say, the pulses shown in wave form D produced by the phasing circuit are prevented from passing through the gate by the application of wave form F on gate G1. The output of gate G1 consists of a train of narrow pulses beginning after the termination of the ready signal of wave form F. These pulses are shown in wave form G in Fig. 2. Due to the uncertainty in the transition time of the ready signal, the first of the pulses of wave form G will occur either at the center of time slot 16 or of time slot 17 of wave form A of Fig. 2.

The pulses of wave form G are applied to a binary counter which counts the pulses of wave form G and are applied also to the shift register which uses the pulses of wave form G to control the selection and shifting of the data incoming through the data amplifier. The binary counter is arranged to be reset to the "0" condition by the leading edge of the ready signal of wave form F and is thus ready to count the pulses of wave form G from gate G1. The pulses from gate G1 are also applied to gate G2. Gate G2 is disabled by the binary counter until the binary counter has counted to 4. When the binary counter attains count 4, the condition of the binary counter enables gate G2. As a result of this, the next pulse which passes through gate G1 is passed through gate G2 to the start-stop flip-flop FF and sets the flip-flop to the start condition. The start-stop flip-flop FF in turn controls the starting of an oscillator OSC which serves as a timing clock to control the reception of the information-bearing signal elements following the start signal element and the separation of these elements into permutation code combinations, or "words" as they are called, which may, for instance be the magnitudes of the quantities.

If the first pulse from gate G1 occurs at the proper time, namely at time slot 16, and if there is no error in the received redundant start signal combination 0—1—0—1, the shift register will select the combination 0—1—0—1 as shown in wave form H in Fig. 2. It will be observed that these signals are displaced one-half of a time slot to the right, that is, they are delayed one-half of a signal interval, since their registration in the shift register is controlled by the narrow pulses shown in wave form G. These narrow pulses occur at the middle of a normal signal interval, being produced as the signals of wave form B pass through 0 on their negative transitions. The binary counter will advance as shown in wave form I and will reach a count of four at time slot 19. Wave form I is intended to indicate simply that the binary counter advances one counting step for each of the four pulses of a normal redundant start combination 0—1—0—1. In wave form I the fifth vertical increment or count 5 corresponds to the start of the oscillator which controls the program. When wave form I reaches the end of count 4, a start pulse is applied to the start-stop flip-flop FF at time $c$ as shown in wave form J. As a result the start-stop flip-flop FF is set to the start condition as shown in wave form K and the oscillator starts in the 0 voltage phase as shown in wave form L. Thereafter the oscillator produces clock pulses as its voltage wave L passes through 0 in the negative direction. This occurs at the center of the incoming time slots as shown in wave form M.

When the first pulse from gate G1 is delayed for one signal interval, so that it occurs at time slot 17 instead of at time slot 16, if the oscillator is to be started at the proper time to receive the information-bearing impulses, since the oscillator can be started only after the binary counter has counted four, it is necessary that the binary counter count to four during an interval while only three of the redundant start signal elements are being received. If the binary counter is to attain the count of four during this interval it is necessary to introduce one extra count, that is to say, during the interval while the binary counter would normally count 3 it is necessary to produce an extra counting pulse and apply it to the binary counter, so that the binary counter will have counted to four at the time that counting of the redundant pattern is ended, so as to permit the oscillator to start. As explained, a normal redundant start signal pattern of which sampling is started at the proper time, that is, at the sixteenth time slot, would appear as 0—1—0—1. If the sampling does not start until the seventeenth time slot and if the second and third elements of the redundant start signal pattern are correct, the first signal element which will be received will be a "1" during the seventeenth time slot and the second element will be a "0" which is received during the eighteenth time slot. When the binary counter has counted two elements, if it is found that the combination "1—0" is stored in the shift register rather than the normal "0—1," stored when sampling starts on time, the circuit is arranged to feed an extra count pulse to the binary counter to compensate for the late sampling of the redundant start signal combination. By means of a logic gate connecting to the shift register and the binary counter when the combination "1—0" is found in the shift register when the binary counter has counted two elements, an extra count pulse is applied to the binary counter after a delay of one-half time slot. Wave form N in Fig. 2 shows the redundant start signal pattern for this condition. Wave P at time $d$ shows that the extra count is inserted after the count 2 has persisted for only one-half of a normal interval, so that the binary counter goes from count 2 to count 3 at this time.. Count 3 also persists for only one-half of a normal time interval and then in response to the sampling of the final element of the redundant group, the binary counter is actuated to count 4. That is to say, at the center of time slot 18 the binary counter has counted two pulses and the register has stored the "1—0" combination. The signal is selected by the shift register as shown in wave form N. The extra count pulse is shown in wave form R causing the counter to advance as shown at time $d$ in wave form P. The binary counter, therefore, reaches the count of 4 at time slot 19 and causes the oscillator to be started at time slot 20. Thus with no error in the received signal, even though the sampling is started late, the oscillator is always started at time slot 20 in spite of irregularity in the ready signal approaching ±1 time slot.

To allow for a late start of one signal element duration and a possible single error in the "0—1—0—1" start combination, the logic gates also causes an extra count pulse to be inserted in the binary counter when the binary counter has counted three impulses as a result of counting the second, third and fourth signal elements of the redundant start signal element and a single error in the combination is detected which has changed the elements which should be "1—0—1" to either "1—1—1" or "0—0—1". The manner in which the present circuit corrects for single errors in the redundant start signal pattern will now be described functionally.

Reconsidering the condition whereunder the redundant start signal pattern begins in its normal position at time slot 16 and the shift register should select as as shown in wave form H, it should be apparent that an error in any one of the four signal elements in the "0—1—0—1" redundant start signal combination cannot result in the registration of a "1—0" after counting the first two elements or the registration of either "1—1—1" or "0—0—1" after counting the first three elements. The reason for this is that in order to produce a "1—0" in response to the reception of the first two elements "0—1" of the start combination, it would be necessary that each of the two signal elements be in error. That is to say, a double error rather than a single error would be necessary to produce the "1—0" combination. In order to produce the combination "1—1—1" or "0—0—1" at count 3, it would be necessary that two signal elements be in error in each instance. The present arrangement will correct for but a single error in the redundant start signal pattern. It was explained in the foregoing that when a "1—0" pattern appeared in the shift register after counting the first two elements and either a "1—1—1" or a "0—0—1" pattern appeared in the register after counting the first three elements, an extra pulse was inserted in the binary counter, so that it attained count 4 during the nineteenth time slot. Since none of the above three conditions calling for the insertion of an extra pulse can occur when the sampling of the redundant start signal pattern starts in the normal position, that is, during the sixteenth time slot, the counting of the elements of a group, the sampling of which starts on time, is unaffected by the provision of the circuitry which introduces the extra pulse under the three foregoing conditions. The counting of an on-time group, therefore, proceeds normally in spite of any single error and the oscillator is started at time slot 20.

For the case wherein the reception of the redundant start signals start at time slot 17 and the fourth signal element of the redundant group is in error, as shown in wave form 0, it will be observed that the first two elements of the pattern are "1—0." These are the same two elements as the first two elements in wave form N. In response to their appearance in the shift register at time slot 18, it was shown that an extra count was introduced as shown at time d in wave form P. The same thing occurs when the wave form is as shown in wave form 0 and the last element of the redundant group is in error. The fact that the last element is in error produces no effect as the count is corrected in response to the "1—0" pattern occurring in the seventeenth and eighteenth time slots.

When the counting starts one element late and the third signal element of the redundant start signal pattern is in error as shown in wave form T, the "1—1—1" combination registered at 3 count adds an extra pulse at time e as shown in wave form V. Similarly, an error in the second element of the redundant group, as shown in wave form U, produces a registered combination "0—0—1" after the counting of three elements. This, as explained in the foregoing, also produces an extra count pulse as shown in wave form V. Thus even for single errors an extra count pulse always is injected when the sampling of the redundant pattern starts at time slot 17. It is emphasized, however, that an extra pulse is never inserted if the sampling of the redundant start signals started at the proper time slot, that is, at time slot 16. The resulting start pulses for the conditions whereunder an extra pulse is added are shown in wave forms S, and Y in Fig. 2.

Referring again to Fig. 1, gate G1 is inhibited over conductor INHB when the start-stop flip-flop FF goes to the start condition at time slot 20. This cuts off the count pulses after time slot 20, as shown in wave form G. Thereafter the oscillator in the receiver furnishes the clock pulses for control of the receiving program. If desired, time slot 20 may be used as the first message information-bearing slot. However, under this condition it would be selected by the last count pulse from gate G1. It may be preferred to use time slot 21 as the first message information-bearing slot, the pulse for this to be supplied by the receiving oscillator.

The oscillator, once started, after the reception of the redundant start signal pattern, will continue to oscillate under control of the program control for as many cycles as there are time slots in the information-bearing portion of the signal train. At the end of this period the program control sets the start-stop flip-flop FF back to the stop condition over conductor Stop. Another train of signal elements, such as the one described, having a preliminary group of double-frequency elements at its beginning, is then awaited. If for any reason the start-stop flip-flop FF is not set into the stop condition at the end of the train by the program control, the program will be stopped in response to the generation of the leading portion of the ready signal produced by the synchronizing pattern of the following train as shown in wave form F.

Attention is called to the fact that the time slots used for the synchronizing pattern need not be of the same duration as the time slots used in the message proper and that the frequency of the local clock need not be the same as that of the phasing signal. When these are made equal, it facilitates the design of the circuitry. Further, these time relationships afford a ready signal which is easily distinguishable from any combination of data digits. When the communication is by means of frequency modulation and the signal-to-noise condition is such as to permit an amplitude modulator detector to sense the presence of carrier, a no-carrier gap between the messages could be used for the ready function. This would permit the phasing signal to be of such frequency as to require no greater communication band width than the message proper.

DETAILED CIRCUIT DESCRIPTION

Figure 5:
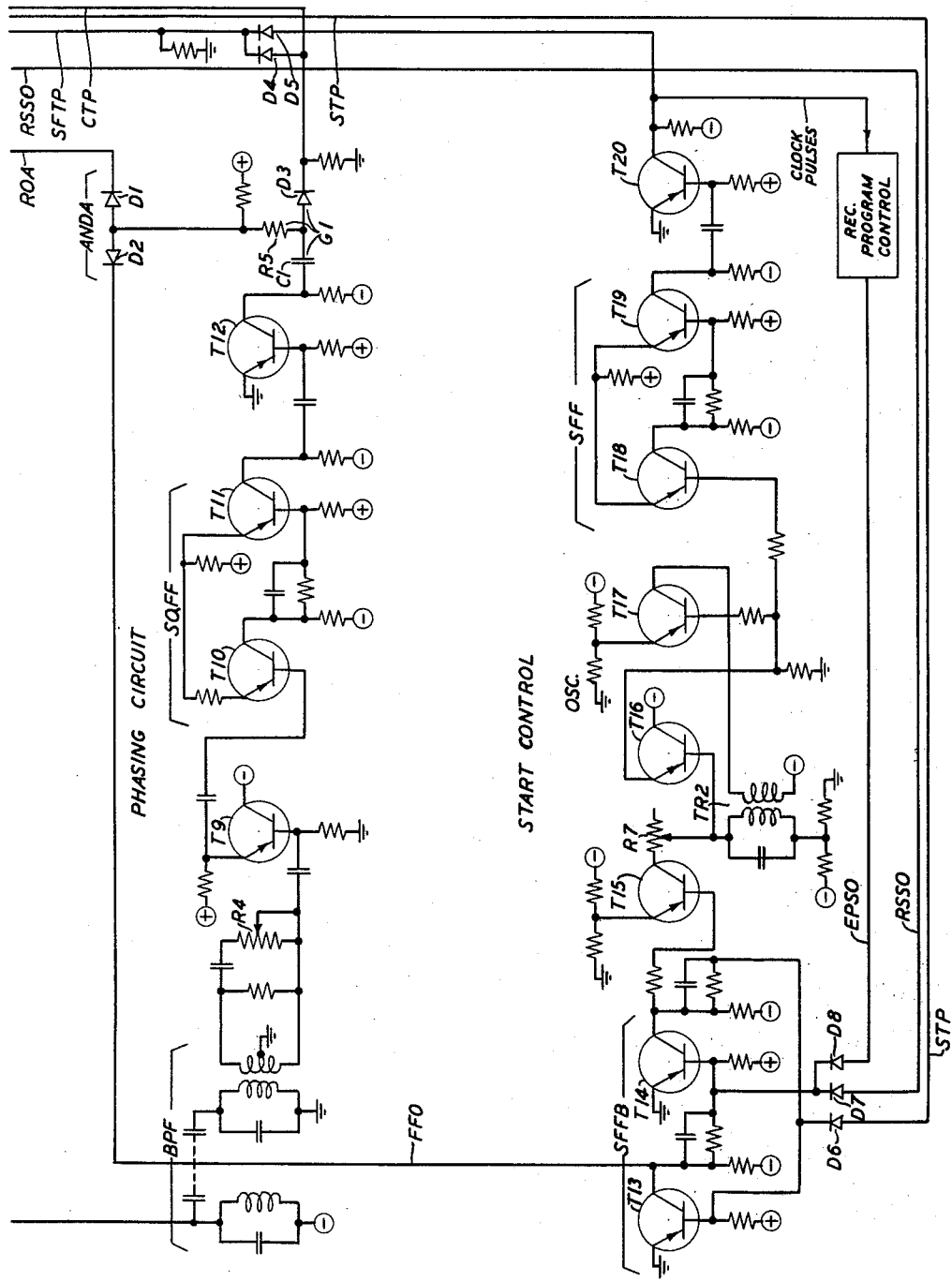
Figure 6:
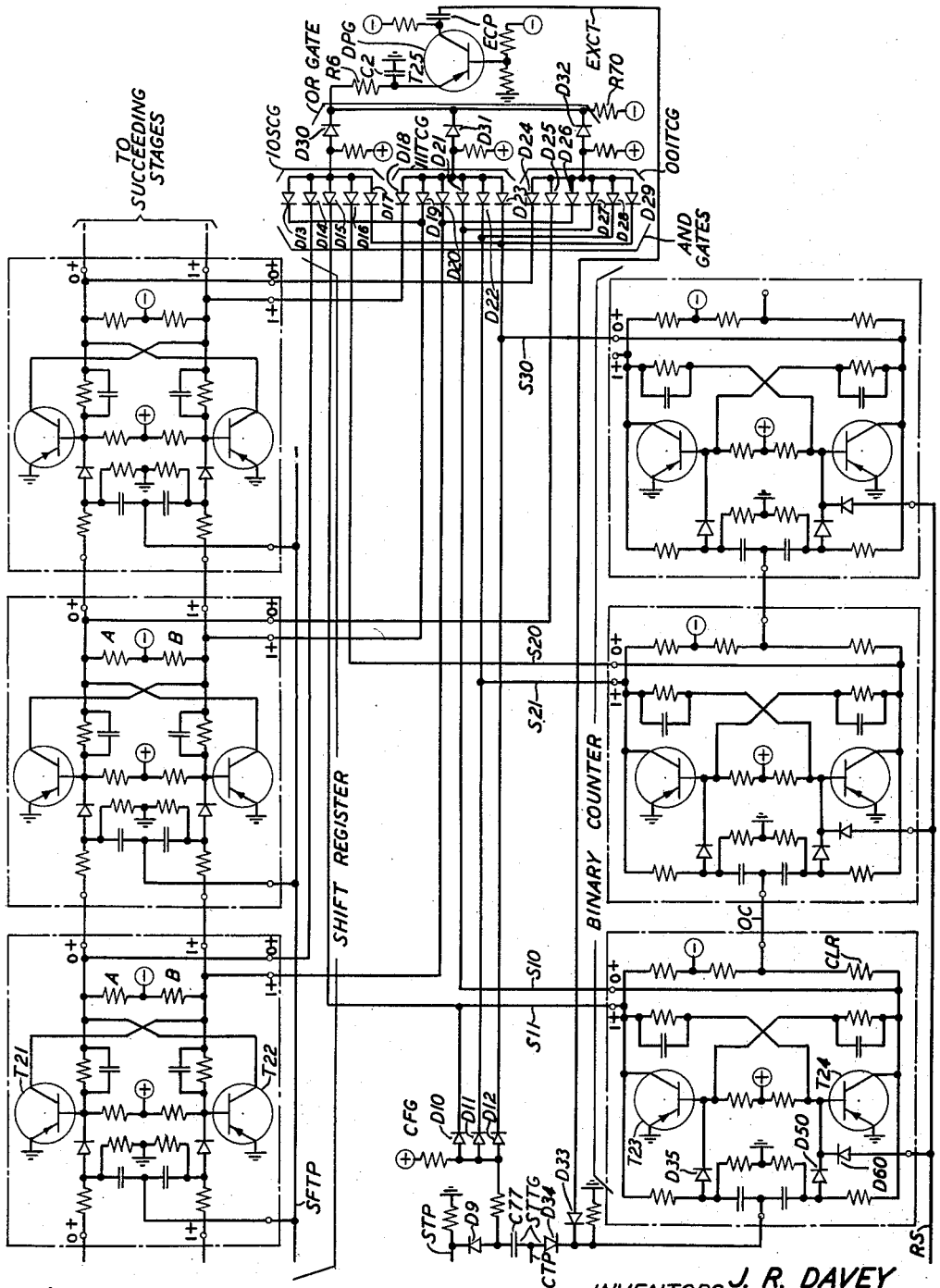

The detailed circuit of the invention is shown in Figs. 4, 5 and 6 arranged as in Fig. 3. It will be observed that the circuit is completely transistorized. In the following description, reference is made to the wave forms of Fig. 2.

Data amplifier

When the invention is incorporated in a radio telegraph system, the incoming signal is first passed through a radio receiver, shown at the left in Fig. 4, and then through conductor RCSG to the data amplifier branch. It is passed through a receiving gain control potentiometer R1 to the grounded-emitter transistor amplifier T1. The signal from the collector of amplifier T1 is passed through the low pass filter LPFA and applied to the slicing flip-flop RCSL consisting of transistors T2 and T3 with common-emitter type coupling. The two collectors furnish a push-pull type of data signal to the shift register. The output from the collector of transistors T2 and T3 is impressed through conductors 0+ and 1+ on the input of the shift register shown in the upper portion of Fig. 6. All of the digital circuitry is arranged to provide, or work with, voltage levels near ground for one condition and between —15 and —20 volts for the other condition.

To amplify the foregoing, the data amplifier branch receives all signals of each train and amplifies them. The low pass filter LPFA prevents the double frequency signals of the first ten time slots from passing and also minimizes the noise which is passed.

The redundant start signal pattern and the intelligence-bearing signal elements of each train pass through the low pass filter LPFA and are impressed on the receiving slicer RCSL. This is a two-transistor flip-flop circuit, comprising transistors T2 and T3, operating in such manner that when one transistor, say transistor T2, is in the conducting condition the other transistor T3 is in the non-conducting condition. When either transistor is in the conducting condition, the potential of its collector and of the output conductor connected to the collector, which connects to the first stage of the shift register of Fig. 6, is near ground and when either transistor is in the non-conducting condition, the potential of its collector and of the conductor interconnecting the collector and the shift register will be between approximately —15 and —20 volts. Thus one conductor of the pair of conductors designated 0+ and 1+ will be near ground potential and the other at approximately —15 and —20 volts at any one time. The receiving slicer flip-flop RCSL squares up the redundant start signals and the intelligence-bearing signals and establishes definite direct-current levels for the "0" and "1" signal conditions before impressing them on the shift register.

The output of the low-pass filter LPFA is first applied to the base of transistor T2 of the flip-flop receiving slicer RCSL. When the applied signal element is negative, transistor T2 conducts, and its collector which is negative for the non-conducting condition, becomes more positive or approximately ground potential.

It will be assumed that normally transistor T2 is conducting and transistor T3 is cut off. The potential of the output from the collector of transistor T2 is therefore near ground and the potential of the output of transistor T3 is at between —15 and —20 volts. In response to a positive transition of a signal pulse applied to the base of transistor T2, transistor T2 cuts off. Its collector and output conductor go sharply negative to approximately —15 to —20 volts. The negative pulse is applied also to the base of transistor T3 which responsively conducts. The collector and output conductor of transistor T3 go positive to approximately ground.

This condition will persist for the duration of at least one signal interval or time slot. In the event that the signal condition does not change for several time slots, that is, if the condition of a succession of signal elements remains the same, the receiving slicer flip-flop RCSL will remain in the assumed condition until a negative signal transition is applied to the base of transistor T2. In response to this the conducting conditions of transistor T2 and T3 will be reversed, as will also the potential conditions of their output conductors.

Ready detector

The ready detector is shown in the lower portion of Fig. 4. The received signal is coupled to the grounded-emitter amplifier T4 which amplifies it. The collector output from transistor T4 is further amplified by the grounded-emitter amplifier T5. The collector load of amplifier T5 consists of transformer TR1, which is tuned to the frequency of the ready phasing portion of the synchronizing pattern. In this case, therefore, it is tuned to the double-frequency reversals of the first ten time slots. The output of the tuned secondary of transformer TR1 is shown in wave form E in Fig. 2. This wave, as explained, will have a variably rounded envelope due to the effects of noise and of changes in the amplitude of the received signals. This signal is full wave rectified by the diode bridge B1 and filtered by low-pass filter LP2. The resulting wave is applied to the common-emitter coupled slicing flip-flop transistors T6 and T7. The slicing level is adjusted by control potentiometer R3 to produce an output as shown in wave form F of Fig. 2. Due to the variations in the envelope of wave form E, wave form F has an uncertainty as to its times of beginning and end. This uncertainty in the present case is assumed not to exceed one signal element of normal duration and is represented by the two dotted rectangles at the beginning and end of wave form F.

It will be observed that wave form F is a continuous negative pulse which begins during the fourth or fifth time slot and persists until the fifteenth or sixteenth time slot. It is applied from the collector of transistor T7 through conductor ROA to the right-hand terminal of diode D1 of the And A gate comprising diodes D1 and D2. It will disable the gate G1 as long as it persists and thus prevent the passage of the pulses produced in the phasing circuit from passing through gate G1. These pulses, when permitted to pass, cause the binary counter to count. They also enable the redundant start signal pulses to be registered in the shift register. Counting cannot start and registration cannot start until the And A gate is enabled. Because of the fact that the ready signal may not terminate and the first pulse pass through the And A gate until after the first element of the redundant pattern has appeared at the first stage of the shift register, this first element may not be registered in the shift register, because an enabling pulse from the phasing branch of the circuit is required to permit registration. Therefore it is necessary to deduce this fact by sensing the elements which are actually stored in the shift register and to make a correction in the counting of the redundant pattern if necessary. This, as mentioned heretofore, is one of the functions of the logic gates. The other function, as mentioned is to correct the counting, if necessary, notwithstanding the appearance of a single error in the redundant signals as registered. Transistor T8 is used to reset the binary counter after counting. It is a grounded emitter pulse amplifier. Its base is normally held biased positively with the collector current cut off. The leading negative-going transient of the ready signal from the ready slicer causes a momentary conduction and a positive pulse to appear at the collector of transistor T8. This pulse is passed through conductor RS which connects to all of the stages of the binary counter, shown in the lower portion of Fig. 6, in parallel. This will be described hereinafter.

Phasing circuit

The phasing circuit is shown in the upper portion of Fig. 5. A band-pass filter BPF is connected to the collector of transistor amplifier T4 in Fig. 4. The filter accepts the phasing portion of the synchronizing pattern and has such band width and envelope delay as to have an output reaching a maximum during the reception of the redundant start signal pattern "0—1—0—1." The time of this response, as shown by wave form B in Fig. 2, straddles the time of reception of the redundant group, as a comparison of waves B and A will show. The filter output is passed through phase adjustment control potentiometer R4 and is amplified by the emitter-follower transistor stage T9. The wave is then squared by the common-emitter coupled squaring flip-flop SQFF consisting of transistors T10 and T11. The squared wave is shown in wave form C in Fig. 2. The negative-going transitions of this wave are applied to the base of pulse amplifier transistor stage T12 and each such transition causes transistor T12 to conduct momentarily and thus to produce a sequence of narrow positive pulses at the collector, as shown in wave form D in Fig. 2. The phase control potentiometer R4 is adjusted to center these pulses with respect to the time slots appearing at the output of the receiving slicer RCSL, shown in the upper portion of Fig. 4. Thus one of these pulses occurs at the center of each of the elements of the redundant group.

Count pulse gate G1

The pulses from the transistor amplifier T12 are applied to the diode gate G1 consisting of capacitor C1, diode D3 and resistor R5. This gate is controlled by the And A gate comprising diodes D1 and D2. That is to say, the passage or non-passage of a pulse through gate G1 is controlled cooperatively by like conditions imposed on diodes D2 and D1 from their connected circuits. Pulses are passed through gate G1 only when the inputs to both diodes D1 and D2 are near ground. When the pulses of wave form D start, the start-stop flip-flop SFFB shown at the lower left in Fig. 5 is in the stop condition for reasons to be explained hereinafter and the potential of the collector of transistor T13 is near ground. This condition is applied through conductor FFO to diode D2 and tends to enable gate G1. However, it alone is ineffective as the signal from the output of the ready detector circuit, in the lower position of Fig. 2, which is applied through conductor ROA on diode D1, appears as a negative voltage of about −20 volts at the collector of transistor T7 and maintains gate G1 disabled. That is to say, this combination of potentials applied to diodes D2 and D1 prevents any pulses from being passed from the phasing circuit, shown in the upper portion of Fig. 5, through diode D3 of gate G1. At the end of the ready signal, that is at the time of the positive transition of the prolonged negative potential condition shown in wave form F, the collector of transistor T7 swings in the positive direction to about ground potential. This enables gate G1, and the pulses of the pulse train, from the phasing circuit, which occur after the positive transition of the wave form F, are passed through gate G1, as shown in wave form G in Fig. 2. Positive counting pulses, for counting the signal elements of the redundant start signal pattern, are thus applied through conductor CTP to the binary counter by way of diode D34. As mentioned, these same pulses are used as control pulses, to control the storing and shifting of the redundant start signal elements in the shift register. For this purpose they are applied through diode D4 and conductor SFTP to all of the stages of the shift register in parallel.

Binary counter

The binary counter consists of three stages as shown at the bottom of Fig. 6. These stages are of the familiar Eccles-Jordan type using a pair of grounded-emitter transistors such as transistors T23 and T24 in each stage.

The positive count pulses are gated to the base of that transistor which is currently conducting, causing it to cut off and, by collector-to-base cross coupling, to initiate conduction in the opposite transistor. The gates employed are of the series, capacitor and diode type and are controlled by the collector voltages of the same stage. For example, if transistor T23 is conducting and transistor T24 is cut off, the near-ground condition at the collector of transistor T23 will reduce the bias across diode D35 to near zero and permit the positive count pulse to reach the base of transistor T23. On the other hand, the negative condition at the collector of transistor T24 back biases diode D50 connected to its base, so as to prevent passage of the pulse. The lower transistor T24 conducts for the zero-count condition, and the output connection through its connected load resistor CLR provides a positive pulse through conductor OC at the "1" to "0" transition. This provides the carry pulse to the succeeding stage. Each stage is also provided with a reset connection, from the collector of transistor T8 in Fig. 5, through conductor RS and a diode such as D60 to the base of the lower transistor in each stage such as transistor T24. The positive reset pulse from transistor T8 causes all stages to be set to the "1" condition prior to the counting period. By setting the binary counter to the all "1's" condition, instead of the all "0's" condition, the production of interfering carry pulses between stages is avoided. The normal counting pulses are applied through diode D34, and the pulses which introduce an extra count are applied through diode D33 in a manner described hereinafter.

Shift register

The shift register uses circuitry identical to the binary counter except that the data input leads for each stage connect to the outputs of the preceding stage.

The output conductors from the collectors of transistors T2 and T3 connect to the bases of transistors T21 and T22, respectively in the first stage of the shift register, in Fig. 6. The registering of the conditions of the redundant start signals is under the joint control of the output of the receiving slicer flip-flop RCSL and of the pulses from the phasing circuit branch which latter are applied to the shift pulse conductor SFTP. Conductor SFTP connects to each of the stages of the shift register in parallel. These pulses are those shown in wave form G in Fig. 2. The pulses cease, for reasons to be explained, when the local oscillator is started and the pulses which control the transfer of conditions of the information-bearing signal elements from one shift register stage to the next are originated by the local oscillator, in the lower portion of Fig. 5, and transmitted through flip-flop SFF, transistor amplifier T20 and the same shift pulse conductor SFTP to the shift register stages in parallel.

It is particularly pointed out that each stage of the shift register registers the condition of only one signal element. To register the condition of the multi-element permutation code signal combinations of the signal train, following each redundant start signal pattern, there will be as many shift register stages required in the shift register as there are signal elements in each combination. There may be, for instance, twelve signal elements in each combination and five combinations in each train following the redundant start signal elements of a train. The shift register will be actuated, as each signal element of a combination is received, to fill each of its stages successively until all signal elements of a combination are registered. Then the shift register will be actuated under control of the receiving program control, well known in the art and indicated by a captioned rectangle in the lower right-hand corner of Fig. 5, to transfer all of the signal conditions for each combination stored in all of the stages of the shift register to an individual storage register, not shown, for each combination. The storage register has an individual storage stage for each signal element of the combination. The redundant start signal pattern in each train will be sensed by the logic gates while it occupies the first two or three stages of the shift register. In response to the reception of the following signal elements of an intelligence-bearing combination, the stored redundant start pattern will be moved progressively to the right, until, when all stages of the shift register are occupied by the intelligence-bearing combination, the last of the redundant start elements will be erased.

Logic gates

A system of diode gates, called logic gates, is the means of determining whether or not an extra count is to be impressed on the binary counter, to insure that the count of four is attained therein and the local clock, or oscillator, started at the proper time, notwithstanding the first signal element of the redundant start signal pattern may be sensed one time slot late and may contain a single error. One group of these gates comprises three individual multidiode gates, known in the art as And gates. These are the three separate groups of diodes shown in vertical alignment in the right-hand portion of Fig. 6.

Diodes D30, D31 and D32 and their respective resistors and battery supplies comprise an Or gate. The Or gate operates when any one of the And gates operate, that is, when the top, middle or bottom And gate operates.

The top And gate consists of diodes D13 to D17 inclusive. It is intended to cause an extra pulse to be passed to the binary counter where it is found that the combination 10 rests in the shift register at the count of two by the binary counter. This gate has an individual diode connecting to the first two register stages, that is, the two left-hand stages, and an individual diode connecting to each of the three binary counter stages. The connections are made in such manner that a potential near ground will be impressed on each of them when a 10 combination rests in the register and the binary counter is at a count of two. It is to be understood that before counting starts, in response to a reset pulse applied to the binary counter, the counter is set so that each of the three stages is in the "1" connection. In response to the first counting pulse applied thereafter to the counter, the counter is set in the 000 condition, that is, a "0" is registered in each stage. In response to the following pulse, the counter is set in the 001 condition.

It will be noted that this results in the count of the binary counter being one count behind the conventional counting in the binary code. The present binary counter counts 000 for 1, 001 for 2 and 010 for three, whereas in counting in the conventional binary code 000 is usually 0, 001 is 1, 010 is 2, etc. In registering a 001 in the binary counter a "1" condition appears in the left-hand stage of the three-stage array, shown at the bottom of Fig. 6, and a "0" condition in the other two stages. Each of these stages has two transistors. When any stage is in the "1" condition, the conductor connected to the collector of the upper transistor of the stage is at near ground potential and the conductor connected to the collector of the lower transistor of the stage is at between −15 and −20 volts. When any stage is in the "0" condition, these potentials are reversed. Applying this to the interconnections between the three stages of the binary counter and the top And gate, it will be seen that since the left-hand stage is in the "1" condition and the collector of its upper transistor T23 is near ground potential, the connection to the first And gate is made from the collector of the top transistor T23 to diode 15. For the two right-hand stages of the counter, in each of which a "0" is assumed to be stored, the collector of their lower transistors will be near ground potential. Consequently a connection is made from the collector of the lower transistor of the middle stage to diode 16 and from the collector of the lower transistor of the right-hand stage to diode D17. Thus the left-hand terminal of each of the three lower diodes of the top And gate in Fig. 6 will all be near ground potential.

When a 10 condition rests in the shift register at count two of any redundant group, the "1" condition will appear in the middle and the "0" condition in the left-hand stage of the three stages of the register shown in the upper portion of Fig. 6. The collector of the upper transistor of the middle stage of the register will be at ground potential when the "1" condition is registered therein. This collector is shown connected to diode D13 of the top gate. The collector of the lower transistor of the left-hand stage of the register will be at ground potential. This is connected to diode D14 of the top gate. There is no connection from the right-hand stage of the shift register to the top And gate as it is not involved in the sensing presently under consideration.

From the foregoing it is apparent that when there is a 10 combination registered in the shift-register at a count of two by the counter, all five diodes of the top And gate will have ground connected to their left-hand terminals simultaneously.

The top And gate has the right-hand terminals of its five diodes connected in parallel and to the left-hand terminal of diode D30. The right-hand terminal of diode D30 is normally maintained negative by a negative source of potential connected through resistor R70. When all of the diodes of the top gate have their left-hand terminal connected to near ground potential, the potential of right-hand terminal of diode D30 changes to about ground and capacitor C2 is charged positively through resistor R6.

Transistor T25 is a point contact type transistor. It is connected as a monostable pulse generator. When its emitter reaches its base potential a positive pulse is obtained at the collector. This is used as the extra count pulse for the presence of the 10 combination of the redundant group at a count of two in a manner to be explained. The R6 resistor-C2 capacitor combination is connected so as to provide a delay of about one-half time slot. The recovery time of the monostable circuit is great enough to prevent the passage of more than one pulse during the time slot.

The middle And gate, comprising the six diodes D18 to D23, inclusive, is arranged to identify the condition whereunder a 111 combination rests in the shift register and a count of three has been counted by the binary counter. At the count of three, the three stages of the binary counter will be in the 010 condition.

For this condition the collector of the lower transistors of the left-hand and right-hand stages are each near ground potential and are connected to the left-hand terminals of diodes 21 and 23 respectively. The collector of the upper terminal of the transistor in the middle stage of the counter is near ground potential and is connected to the left-hand terminal of diode D22.

As to the shift register, when the 111 condition is registered therein, the collector of the upper transistor in each of the three stages will be near ground potential and one is connected individually to the left-hand terminal of each of diodes D19, D20 and D21. When a potential near ground is impressed simultaneously on each of these six diodes, the registration of 111 at count three is identified and the capacitor C2 is charged as before. This causes transistor T25 to produce an extra counting pulse for this condition also.

The bottom And gate is controlled by the appearance of a 001 condition in the counter at a count of 3 which gives a registration of 010 in the binary counter. Since the counter is in the same condition as explained for the last preceding condition, the left-hand terminals of diodes D21, D22 and D23 in the middle And gate are each connected individually in parallel to diodes D27, D28 and D29 of the bottom And gate as shown in Fig. 6. For the registration of 001 in the shift register, the two right-hand stages are in the "0" condition and the left-hand stage is in the "1" condition. The collector of each of lower transistors in each of the two right-hand stages, each of which is at a potential near ground, is connected to the left-hand terminal of diodes D24 and D25, respectively. The collector of the upper transistor in the left-hand stage of the shift register, which is at a potential near ground, will be connected to the left-hand terminal of diode D26. Thus the left-hand terminals of each of the diodes of the bottom And gate will be at ground potential when 001 is registered in the shift register at a count of three. This causes an extra counting pulse to be transmitted to the counter through the Or gate from transistor T25 as explained.

Reference to wave form Q in Fig. 2 shows the signal from the Or gate produced by the registration of 10 combination at a count of two. It results in the extra count applied to the binary counter as shown in wave form R. The count occurs at time $d$ as shown in wave form P. For the condition of the registration of a 111 combination or a 001 combination at a count of three, the Or gate output, counting pulse and time are as shown in wave forms W and X at $e$ in the time count pattern V, respectively.

The extra count pulse, whenever produced on the collector of transistor T25, is impressed through capacitor ECP and diode D33 on the input of the first, or left-hand stage of the binary counter. The count appearing in the binary counter before the pulse is applied is increased by one. It should be understood from the foregoing that the binary counter normally receives the pulses which it counts from the output of the phasing circuit. They normally occur at a spacing of one full length signal element. When, as a result of the sensing of the signal elements of the redundant group and the simultaneous counting by the binary counter, it becomes necessary to increase the count in the register so that it can count to four before the receiving oscillator is started, an extra count is inserted at the middle of the normal interval between pulses. Thus under such conditions the binary counter counts twice during an interval in which it would normally count once.

*Start gate*

The start gate STTG, that is the gate which starts the receiving oscillator, in response to the counting of four by the counter, at the end of reception of the redundant pattern, comprises diode D9 and is controlled by the count four gate CFG comprising diodes D10, D11 and D12. The count four gate CFG is another "and" gate. In order to enable the count four gate CFG, and permit a counting pulse from the phasing circuit to pass through the start gate STTG, to actuate the start-stop flip-flop SFFB and start the receiving oscillator OSC, it is necessary that the right-hand terminal of each of diodes D10, D11 and D12 be at a potential near ground. These diodes are connected to the three stages of the binary counter in such manner that this condition is produced when the binary counter is in the four-count condition, that is when it is registering 011, with the right-hand stage registering "0" and each of the other stages registering "1." Under such condition, the collector of the lower transistor of the right-hand stage of the binary counter, which is connected to the right-hand terminal of transistor D12, will be at a potential near ground. The collector of each of the upper transistors of the middle and left-hand stages of the binary counter will be at a potential near ground and will be connected to the right-hand terminals of diodes D11 and D10, respectively. Under this condition the positive counting pulse from the phasing circuit which occurs at the middle of time slot 20, will pass through conductor CTP, capacitor C77, diode D9, conductor STP and diode D6 to the base of transistor T13 in the start-stop flip-flop circuit SFFB and set it to the start condition. The pulse which actuates the flip-flop is shown in wave form J in Fig. 2. Prior to the reception of this pulse, the collector circuit of transistor T13 is in the conducting condition and that of transistor T14 is responsively cut off.

Start-stop oscillator

While transistor T13 conducts, the potential of its collector is near ground, thus tending to enable the gate G1 at the output of the phasing circuit, as mentioned heretofore. Now it is desired to prevent any more pulses from the phasing circuit from passing through this gate, as the redundant start signal group has been received, sensed, counted, its counting adjusted, if necessary, and the receiving oscillator OSC is about to be started. The positive pulse applied to the base of transistor T13 cuts off further conduction through the transistor, and its collector responsively goes negative, applying a disabling condition to the And A gate through diode D2. Thus this gate will be disabled at the time the oscillator OSC starts to oscillate. While oscillator OSC oscillates it will produce the pulses to control the shift register. This will continue until the receiving program is ended.

Transistors T13 and T14 are arranged as a flip-flop circuit. When one conducts the other is cut off and vice versa. When the flow of current through the collector circuit of transistor T13 is cut off, its collector goes positive. The positive pulse is applied to the base of transistor T14. The flow of current in the collector circuit of transistor T14 is thereby cut off. The collector of transistor T14 is connected to the base of transistor T15. Transistor T15 is normally in the conducting condition. The collector of transistor T14 goes positive when it conducts as shown in wave form K and the positive potential applied to the base of transistor T15 cuts off the flow of current in the collector circuit of transistor T15.

The receiving oscillator comprises the tuned transformer TR2 and transistors T16 and T17 in the feed-back loop. The base of transistor T16 is connected between the collector of transistor T15 and the primary of tuned transformer TR2 and the collector of transistor T17 is connected to its secondary. While transistor T15 is conducting, its collector current flows through the tuned circuit of the oscillator and is adjusted by potentiometer R7 to be equal to the maximum tuned circuit current when freely oscillating. When current flow through the collector circuit of transistor T15 is interrupted the receiving oscillator OSC starts to oscillate in the zero voltage phase and no transient is generated, in a manner well known in the art and as shown in wave form L in Fig. 2.

The output from the oscillator OSC is applied to the squaring flip-flop circuit SFF consisting of transistors T18 and T19 in a common emitter coupled circuit. Transistor T20 operates as a pulse amplifier similar to the operation of transistors T8 and T12. A series of pulses, termed clock pulses which occur at the middle of the time slots, is thus produced as shown in wave form M in Fig. 2.

Dependent on the requirements of the message portion of the signal train, following the redundant start pattern, the system in which the invention is applied will be provided with a program control well known in the art and indicated by a captioned rectangle at the lower right in Fig. 2. In one form of operation known in the art, this program control takes the form of a binary counter arranged to count a number of oscillator produced clock pulses, such as those shown in wave form M, equal to the number of signal elements in the incoming train following the redundant pattern. If the train is separable into groups of signal elements forming "words," the binary counter will be tapped, in a manner resembling the tapping of the binary counter as described herein for counting 2, 3 and 4 elements of the redundant pattern. These taps will control diode gates, for instance, to separate the remainder of the train into the proper groupings to constitute the various "words" in the train.

When the counting of the binary counter indicates that the last element of the train has been received, the program control will direct a pulse through conductor EPSO and diode D8 to the flip-flop SFFB to stop the oscillator and to terminate the receiving cycle. The receiver then awaits a new train having a new group of preliminary synchronizing elements at its head end.

It was explained in the foregoing that the ready detector branch of the circuit produces a negative-going transition at the start of the ready signal as shown at the left in wave form A. This, it was explained, was impressed through transistor T8 which responsively produces a short positive pulse which is applied through conductor RS into Fig. 6 where it is applied to all of the stages of the binary counter, to set them all at the 111 condition before counting of the redundant pattern starts. This same pulse is applied through conductor RSSO into Fig. 6 and through diode D7 to the flip-flop circuit SFFB. This pulse is employed to reset the flip-flop SFFB in the event that it has not been reset by the program counter. It may be regarded as an insurance provision. Both of the positive pulses, that is, the first resetting pulse from the program control and the insurance pulse from the ready circuit, are applied through an individual diode, diodes D7 and D8, respectively, which are both connected to present low resistance to pulses of positive polarity, to the base of transistor T14.

It will be recalled that when the receiving oscillator OSC is in operation to time the incoming message elements, the collector circuit transistor T14 is conducting. The application of either of these positive pulses to the base of transistor T14 stops the flow of current in its collector circuit and drives its collector negative. A negative pulse from the collector of transistor T14 is impressed on the base of transistor T13 which causes the collector circuit of transistor T14 to resume conducting, driving its collector to a potential near ground which is applied through conductor FFO on the left-hand terminal of diode D2 to tend to enable the gate and await the positive transition of wave form F from the ready detector circuit through conductor ROA and detector D1 which sets gate G1 in position to pass the pulses from the phasing circuit, as explained in the foregoing.

After the oscillator is started, the pulses from pulse amplifier T20 are applied through diode D5 and conductor SFTP on all the stages of the shift register in parallel to control the shifting of the register. It is to be understood that during the reception of the redundant start signal group the pulses which shift the intelligence from one stage to another in the shift register are received from the phasing circuit through diode D4. The output from the phasing circuit is stopped and the shift pulses for the message elements per se are received from the oscillator once the oscillator is started.

What is claimed is:

1. A start-stop communication or computing system receiver having means therein for receiving a start-stop signal train, said means comprising selecting means for selecting a multi-element group of signal elements preceding the arrival of the first signal element of the intelligence-bearing elements, said group normally a sequence of reversals of two-condition signal elements arranged in a corresponding sequence of positions in said train, sensing means for sensing said multi-element group and sampling means connected to said sensing means for determining if said multi-element group is being sensed late with respect to the arrival of said first signal element.

2. A start-stop communication or computing system receiver having means therein for receiving a start-stop signal train, said train comprising a preliminary group of signals including a first multi-element group of phasing signal elements, for phasing said receiver, and a second multi-element start signal group, for fixing the position of the first information-bearing signal element, following said start signal group, means in said receiver responsive to said phasing signals for determining the positions of the centers of each of the elements of said start signal group, means for counting a plurality of elements of said start signal group, means for sensing the condition of said plurality of elements, a diode gate circuit interconnecting said counting means and said sensing means, and means connected to said gate responsive to a condition of said gate for impressing an extra pulse on said counter to identify the position of said first information element.

3. A start-stop communication or computing system receiver having means for receiving multi-element trains of signal elements, each of said trains comprising a group of signal elements having a plurality of consecutive signal elements, said elements having signal conditions arranged in the same sequence and occupying the same relative position in each of said trains, storing means connected to said receiving means responsive to said reception for storing signal elements of said group, counting means for counting said elements as stored, sampling means for sampling said elements as stored and means responsive to said sampling for adjusting the count of said group of elements as necessary to normalize the sensing of said train.

4. In a start-stop communication or computing system, a first gate, first means responsive to the reception of a first group of signal elements at the head-end of a signal train for impressing a disabling potential on said gate, second means, also responsive to the reception of said first group for transmitting a sequence of narrow pulses through said gate after the impressing of said disabling potential has terminated, a second group of redundant start signal elements in said train, following said first group, means responsive to the reception of said second group, for storing said second group, means for counting the elements of said second group, means responsive to said storing and counting, for sampling said stored elements, means responsive to said sampling for adjusting said count, as necessary, a second gate connected to said first gate responsive to said first gate, said second gate connected also to said counting means, and means responsive to the determination of a satisfactory count for enabling said second gate to pass a pulse from said first gate through said second gate.

5. In a start-stop communication or computing system, a signal receiver having means for receiving a train of signal elements comprising a plurality of signal elements constituting a redundant start group, said group normally a sequence of reversals of two-condition signal elements arranged in a corresponding sequence of positions in said train, means for sampling said group and means responsive to said sampling for determining the position in said train of said sampled elements.

6. A system in accordance with claim 5 having a signal element counter and means responsive to said sampling for adjusting said counter.

7. A system in accordance with claim 6 having a signal receiving oscillator for controlling the reception of signal elements of said train and means responsive to the determination of a satisfactory count by said counter for starting said oscillator.

8. A system in accordance with claim 6 and means responsive to said adjustment for starting an oscillator.

9. A system in accordance with claim 5, said sampling means comprising a shift register and a binary counter and said means responsive to said sampling comprises a logic gate having a plurality of diodes interconnecting said register and counter.

10. In a start-stop communication or computing system, a signal receiver, means in said receiver for receiving a redundant start signal group in a signal train, said group normally consisting of a predetermined plurality of reversals of two-condition signal elements arranged in a continuous sequence, means responsive to said reception for counting the signal elements of said group, means responsive to said counting for determining the presence of an erroneous signal element among said group said train comprising intelligence bearing signal elements all following said group in said train, means responsive to said determining for correcting said count and means responsive to said correcting for identifying the position in said train of the first of said intelligence determining elements.

11. In a start-stop communication or computing system, a signal receiver, means in said receiver for receiving a train of signal elements comprising a first group of signal elements of double normal signal frequency, followed by a discrete number of intervals of no-signal elements, followed then by a redundant start signal group comprising normally a predetermined number of signal reversals at normal signaling frequency and followed finally by a predetermined number of intelligence bearing signal elements, means in said receiver for sampling the signal elements of said redundant start signal group, means responsive to said sampling for determining the presence of an erroneous signal element in said group and means responsive to said determining the presence of an erroneous element for locating the position of the first of said intelligence elements.

12. A system in accordance with claim 11 in which said locating means comprises means for adjusting the counting of elements of said redundant group.

13. In a start-stop communication or computing system, means for receiving a start-stop train of signal elements, said train comprising a first preliminary group of phasing signal elements followed by a second group of redundant start signal elements and then by the signal elements of the message per se, means responsive to the reception of said first group for fixing the position of said second group within a predetermined quantized amount of uncertainty, corresponding to an integral number of signal elements of normal duration in said train, means responsive to the reception of said redundant group for obviating said uncertainty, and means responsive to said obviation for definitely fixing the position of the first of said message elements.

References Cited in the file of this patent

UNITED STATES PATENTS

| | | |
|---|---|---|
| 2,552,629 | Hamming et al. | May 15, 1951 |
| 2,714,627 | Shenk | Aug. 2, 1955 |
| 2,739,301 | Greenfield | Mar. 20, 1956 |